(12) United States Patent
Einarson et al.

(10) Patent No.: US 6,704,781 B1
(45) Date of Patent: Mar. 9, 2004

(54) SYSTEM AND METHOD FOR CONTENT CACHING IMPLEMENTING COMPENSATION FOR PROVIDING CACHING SERVICES

(75) Inventors: Jeffrey W. Einarson, Portland, OR (US); Narayan R. Manepally, Beaverton, OR (US); Holland J. Wood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 547 days.

(21) Appl. No.: 09/604,669

(22) Filed: Jun. 27, 2000

(51) Int. Cl.[7] .............................................. G06F 15/173
(52) U.S. Cl. ...................... 709/223; 709/203; 709/212; 709/214; 709/216; 709/217; 709/218; 709/225; 709/226; 709/227; 707/10
(58) Field of Search .................. 709/203, 212, 709/214, 216, 217–219, 226, 225–227; 711/120–123; 707/10

(56) References Cited

U.S. PATENT DOCUMENTS

| | | | | |
|---|---|---|---|---|
| 5,864,854 A | * | 1/1999 | Boyle ........................... | 707/10 |
| 5,933,849 A | * | 8/1999 | Srbljic et al. ............... | 711/118 |
| 6,038,601 A | * | 3/2000 | Lambert et al. ............. | 709/226 |
| 6,070,191 A | * | 5/2000 | Narendran et al. .......... | 709/226 |
| 6,088,721 A | * | 7/2000 | Lin et al. ..................... | 709/214 |
| 6,167,438 A | * | 12/2000 | Yates et al. .................. | 709/216 |
| 6,240,461 B1 | * | 5/2001 | Cieslak et al. ............... | 709/235 |
| 6,243,719 B1 | * | 6/2001 | Ikuta et al. .................. | 707/204 |
| 6,272,536 B1 | * | 8/2001 | van Hoff et al. ............ | 709/217 |
| 6,330,561 B1 | * | 12/2001 | Cohen et al. ................. | 707/10 |
| 6,330,602 B1 | * | 12/2001 | Law et al. ................... | 709/224 |
| 6,349,137 B1 | * | 2/2002 | Hunt et al. ............ | 379/265.06 |
| 6,370,620 B1 | * | 4/2002 | Wu et al. .................... | 711/132 |
| 6,389,462 B1 | * | 5/2002 | Cohen et al. ................. | 709/218 |
| 6,438,652 B1 | * | 8/2002 | Jordan et al. ................ | 711/120 |
| 6,457,047 B1 | * | 9/2002 | Chandra et al. ............. | 709/217 |
| 6,542,964 B1 | * | 4/2003 | Scharber ..................... | 711/122 |
| 2002/0035672 A1 | * | 3/2002 | Challenger et al. ......... | 711/122 |
| 2002/0129116 A1 | * | 9/2002 | Humphrey .................. | 709/217 |

FOREIGN PATENT DOCUMENTS

WO    WO 99/05584    *  2/1999

* cited by examiner

Primary Examiner—Nabil El-Hady
(74) Attorney, Agent, or Firm—Pillsbury Winthrop LLP

(57) ABSTRACT

A method of providing caching services to a server in a network. An offer of caching services is sent from a caching device to a server. The server receives the offer from the caching device and determines whether to accept the offer of caching services from the caching device. An authorization is sent from the server to the caching device when, as a result of the determining, the server determines to accept the offer of caching services. The caching device stores content from the server after the sending of the authorization from the server to the caching device.

28 Claims, 11 Drawing Sheets

Prior Art

SYSTEM AND METHOD FOR CONTENT CACHING IMPLEMENTING COMPENSATION FOR PROVIDING CACHING SERVICES

BACKGROUND OF THE INVENTION

1. Field of the Invention

Aspects of the invention relate to methods of offering caching services to servers in a network. Other aspects of the invention relate to a caching device and a caching aggregator for offering caching services to a server through a network. Yet further aspects of the invention relate to a server in a network for receiving and either accepting or rejecting offers of caching services from caching devices in the network.

2. Description of Related Art

Caching appliances are typically purchased by Internet Service Providers (ISPs) to provide better Internet performance for their customers. Inktomi and Akamai provide such caching appliances. The caching appliances can be used to reduce the amount of bandwidth consumed by an ISP by serving some requests from a local cache. A caching appliance can also improve internet access performance for end users when the end users access web sites.

Currently ISPs that own caching appliances do not receive any revenue for placing web content on the caching appliances. As content is requested by end users it is copied into a cache as it is delivered. The ISP has no control over what is placed into the cache. There is no compensation to the cache owner by the content provider when content is placed in the cache. There is a need for new caching appliances and methods to make possible the generation of revenue by the owners of such appliances.

BRIEF DESCRIPTION OF THE DRAWINGS

Illustrative embodiments of the invention are described with reference to the following drawings in which.

DETAILED DESCRIPTION

Figure 1:
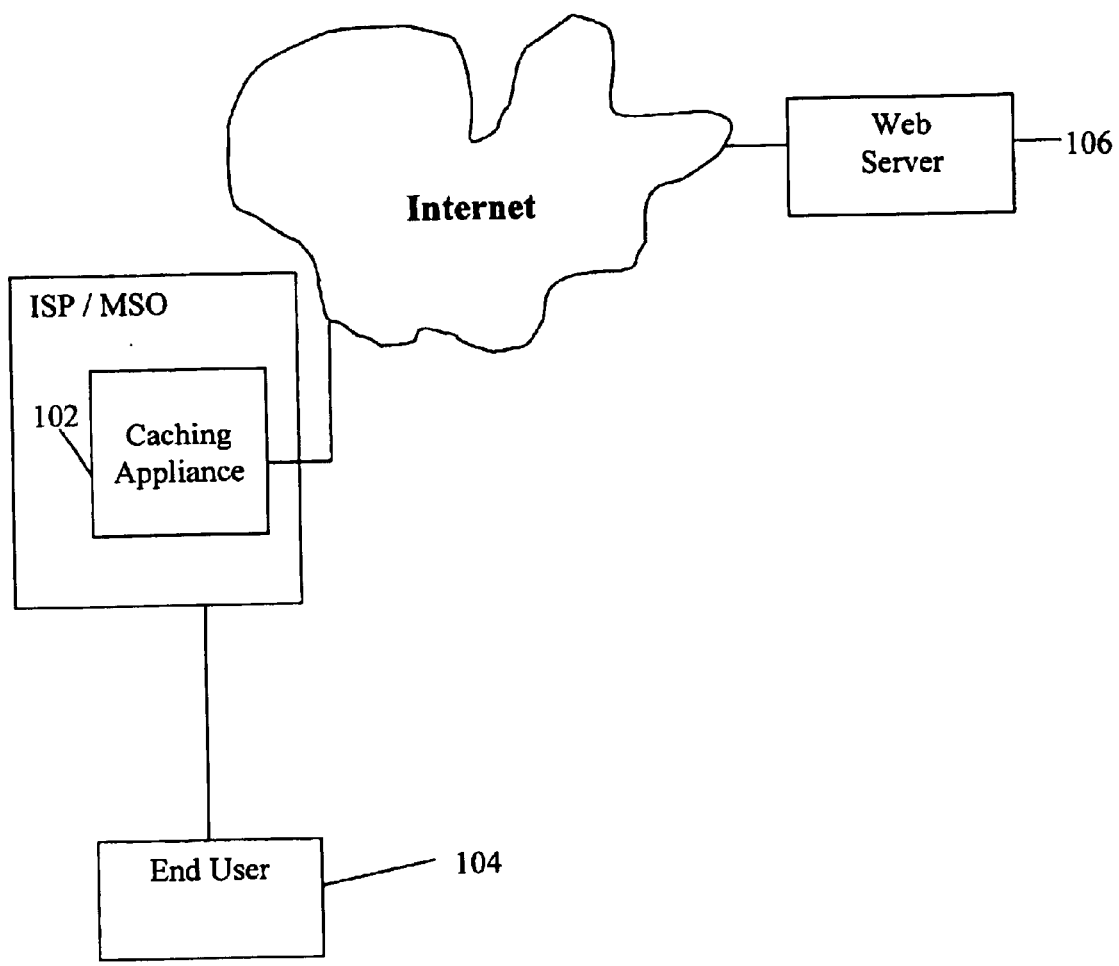
FIG. 1 illustrates a system using a prior art caching appliance.

FIG. 1 illustrates a prior art caching appliance 102 owned by an ISP or a Multiple System Operator (MSO). An end user 104 accesses a web server 106, connected to a network, for example, the Internet, via the caching appliance 102. If the caching appliance 102 has the requested content in storage, the caching appliance 102 can satisfy a request for content from the end user 104 without sending the request through the network to the web server 106. Otherwise, the caching appliance 102 sends the request to the web server 106 and, upon receiving the requested content from the web server, the caching appliance 102 stores the content in its cache for a possible later request from the end user 104.

Figure 2:
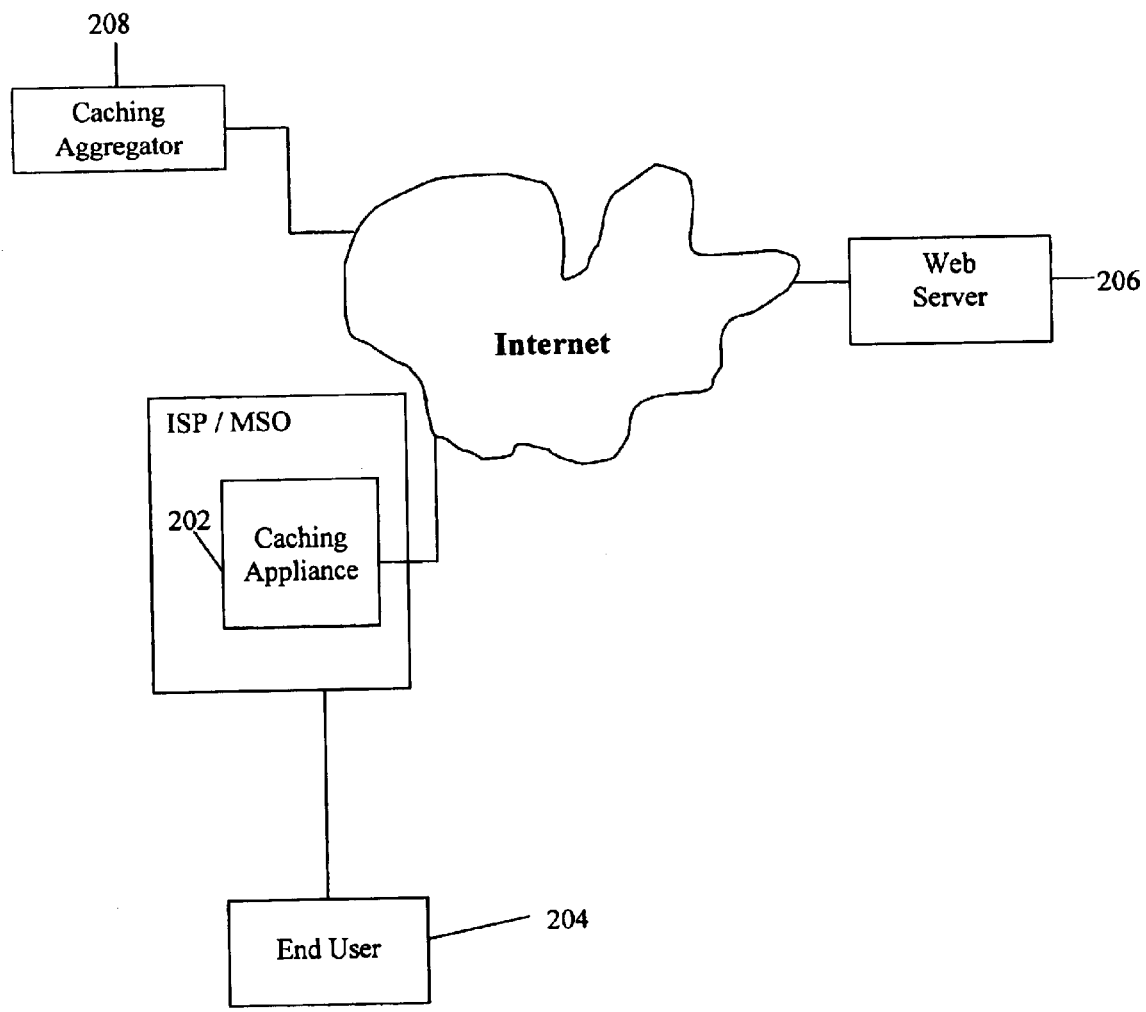
FIG. 2 illustrates a system using a caching appliance and caching aggregator which provide caching services according to the described method.

FIG. 2 illustrates an embodiment of the invention. The caching appliance is connected to the internet and a web or video server 206 is also connected to the internet. An end user 204, requesting content from the server 206, makes such a request through caching appliance 202. If caching appliance 202 has the requested content, the content is delivered to end user 204 without sending the request to server 206. Otherwise, caching appliance 202 sends the request to the server 206 and upon receiving the requested content from the server 206, the caching appliance 202 stores the content in its cache to satisfy a possible later request from the end user 204. The system also contains caching aggregator 208 whose functions and operation will be explained later.

Figure 3A:
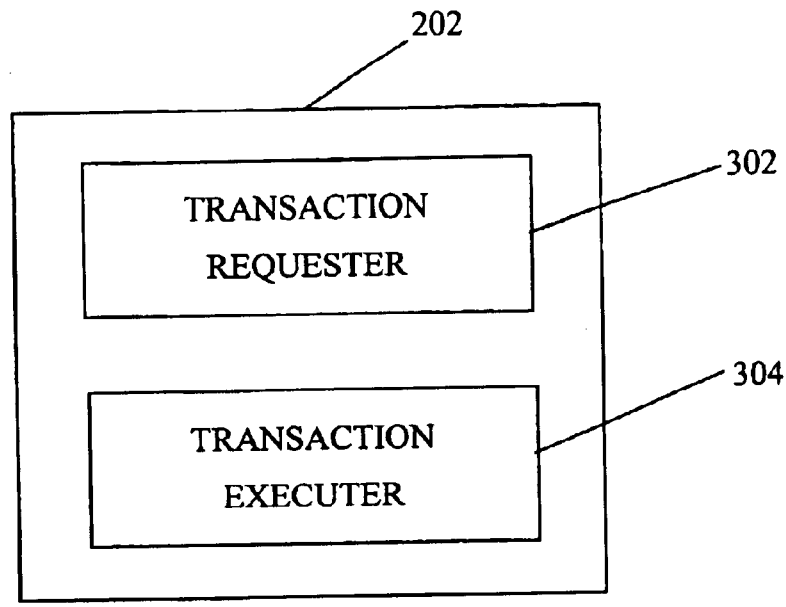
FIGS. 3A and 3B illustrate embodiments of the caching appliance.

FIG. 3A is a more detailed diagram of caching appliance 202. The caching appliance includes a transaction requester 302 and a transaction executer 304. The transaction requester and transaction executer may be implemented in hardware, software, or firmware, or any combination of hardware, software, and firmware.

The transaction requester communicates with the server 206 that would deliver content requested by the caching appliance 202. The transaction requester 302 may also communicate with transaction requesters running on other caching appliances. The transaction requester creates and sends a request to the server 206. The request includes information, such as, for example, a profile of the requesting caching appliance, requested fees for caching origin server content, the timeframe that caching services are available, a summary of charges for caching services, and instructions to the server 206 on how it may track the results of the supplied caching services.

Many caching appliances may be owned by one ISP or MSO. In an embodiment of the invention, the caching appliances create a database that contains the characteristics of the cache owners' cache implementations. The database may contain, for example, the number of caches, the names of the hosts using the caches, the storage capacity available for caching from each of the caches, the amount of data delivered from the cache (updated daily), and other information that describes the caching implementation. All of this information is compiled and utilized by the transaction requestor 302. Using the database, the transaction requesters of different caching appliances may coordinate offering of caching services to the server 206, by communicating with each other. In such an embodiment one caching appliance may act as a master caching appliance, receiving offers of caching services from other caching appliances and combining the offers into one offer of service to be presented to the server 206.

Transaction executer 304 receives a message back from the server 206 and if the received message is an authorization, the transaction executer complies with the request by implementing rules to which the cache will refer when there are subsequent requests to this web site. The rules for caching provide the detailed instructions that dictate how the caching is to be performed. These instructions may specify, for example, the URL (Uniform Resource Locators) of all of the objects that are to be cached that are delivered from a specified host, the time that the cached copy is indicated as current, the time period for the caching, and an amount of storage that the host has purchased for caching. The cache will insure that it doesn't store more content than is allowed. Many different hosts can have their content loaded in a particular cache simultaneously.

Figure 3B:
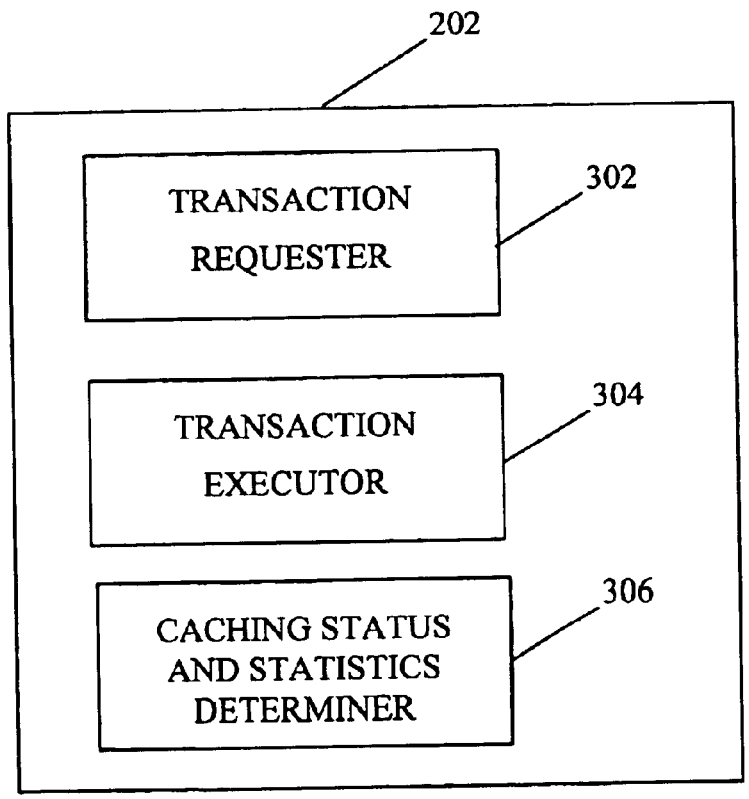

FIG. 3B shows another embodiment of the caching appliance 202. As before, the caching appliance includes transaction requester 302 and transaction executer 304. However, this embodiment includes a caching status and statistics determiner 306. The caching status and statistics determiner periodically determines the caching status and statistics and sends the caching status and statistics to the server 206. The caching status and statistics may also be sent to the server 206 upon receiving a request from the server 206. The caching status information sent to the server 206 may include, for example: URL of site to be cached; number of hits for URL; number of unique visitors; megabytes of content served to users; logs of hits for each page (provides comprehensive reports back to the origin server); and content delivery performance data (provides data on latency for access of web objects from the cache).

The caching status and statistics may be sent by each caching appliance 202 to the server 206, may be sent by each caching appliance 206 to a caching appliance designated as a master caching appliance which receives the caching status and statistics from other caching appliances 202 and combines the caching status and statistics for a cache owner and delivers it to the server 206, or may be sent by each caching appliance 206 to a caching aggregator 208 which combines the caching status and statistics for a cache owner and delivers it to the server 206.

Figure 4A:
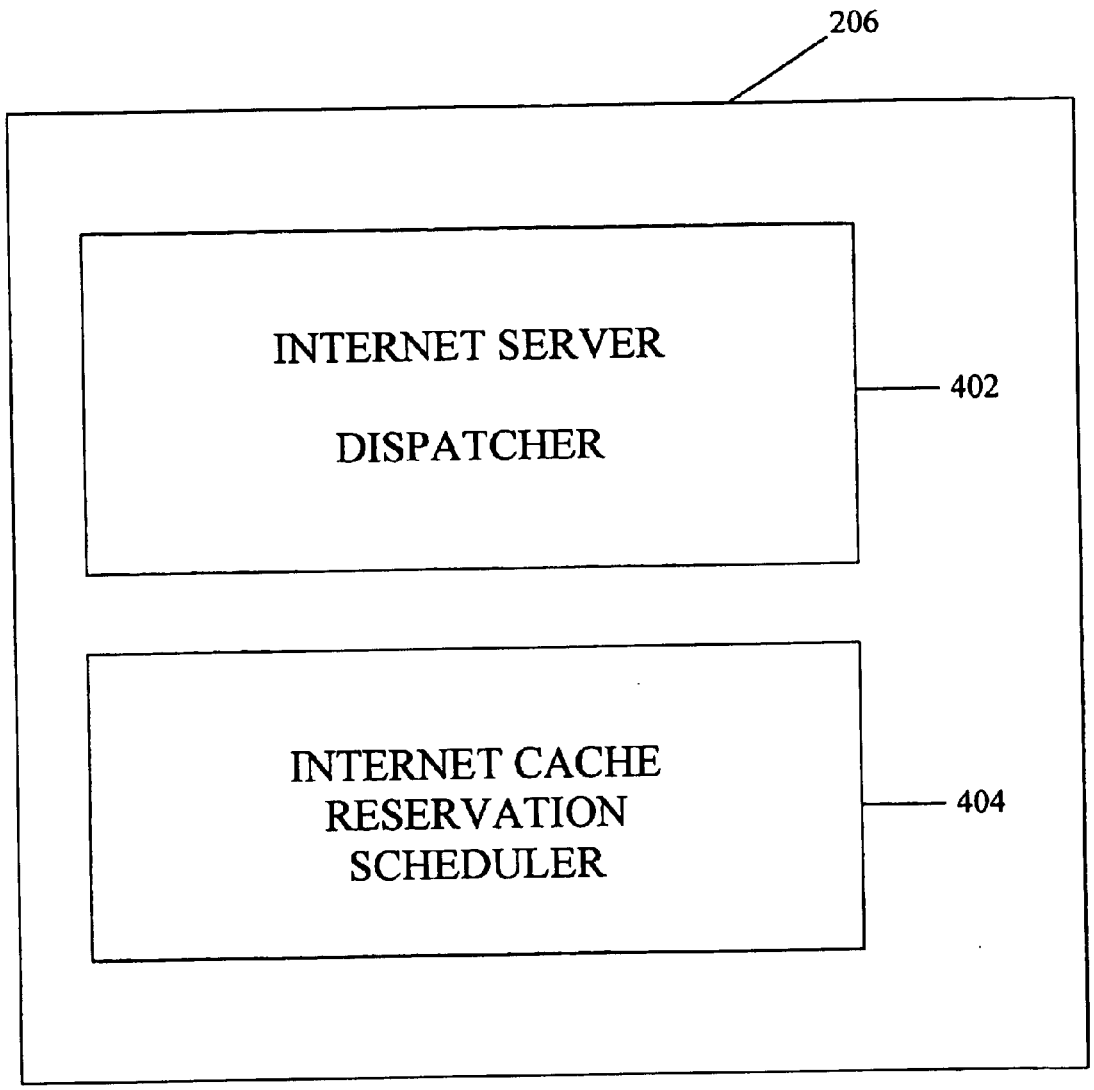
FIGS. 4A and 4B illustrate embodiments of the origin server.

FIG. 4A illustrates in more detail an embodiment of the server 206. The server includes internet server dispatcher 402 and internet cache reservation scheduler 404.

The internet server dispatcher 402 receives a caching request from caching appliances and determines whether to subscribe to the offered caching services. The internet server dispatcher 402 returns an authorization to the transaction requester 302 of the caching appliance 202 when the internet server dispatcher 402 determines that caching services should be subscribed. Otherwise, the internet server dispatcher sends a rejection message to the caching appliance indicating the rejection of the offer of caching services.

Internet cache reservation scheduler 404 determines whether caching services should be subscribed by determining the existence of certain conditions. For example, the internet cache reservation scheduler 404 will subscribe to caching services when the cache performance drops below a certain level. In this manner, the internet cache reservation scheduler 404 helps to guarantee that the server maintains a fast response time. The internet cache reservation scheduler 404 may also determine to accept an offer of caching services when an amount of traffic on the server exceeds a specific level or when an amount of processor utilization in the server exceeds a specific level, thus further guaranteeing fast performance and making the server more resistant to denial of service attacks.

The server 206 may be implemented to operate in a network with or without caching aggregators 208 and caching appliances 202. The server 206 would operate as a prior art server until an offer for caching services is received. Once the offer is received, processing is performed as explained below and in FIG. 7A.

Figure 4B:
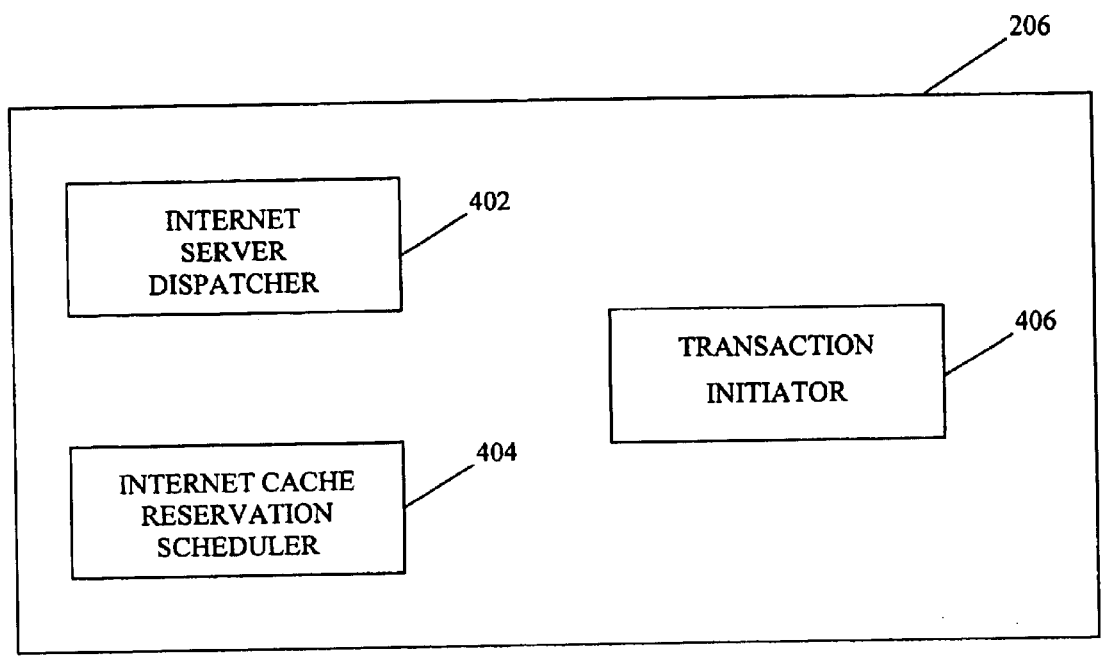

FIG. 4B illustrates another embodiment of the server 206. This embodiment is similar to the embodiment of FIG. 4A, but includes transaction initiator 406 which, when the internet cache reservation scheduler 404 determines that caching services should be subscribed, sends a request to a caching appliance 202 or caching aggregator 208 to cause the caching appliance 202 or caching aggregator 208 to send an offer of caching services to the server 206.

Figure 5:
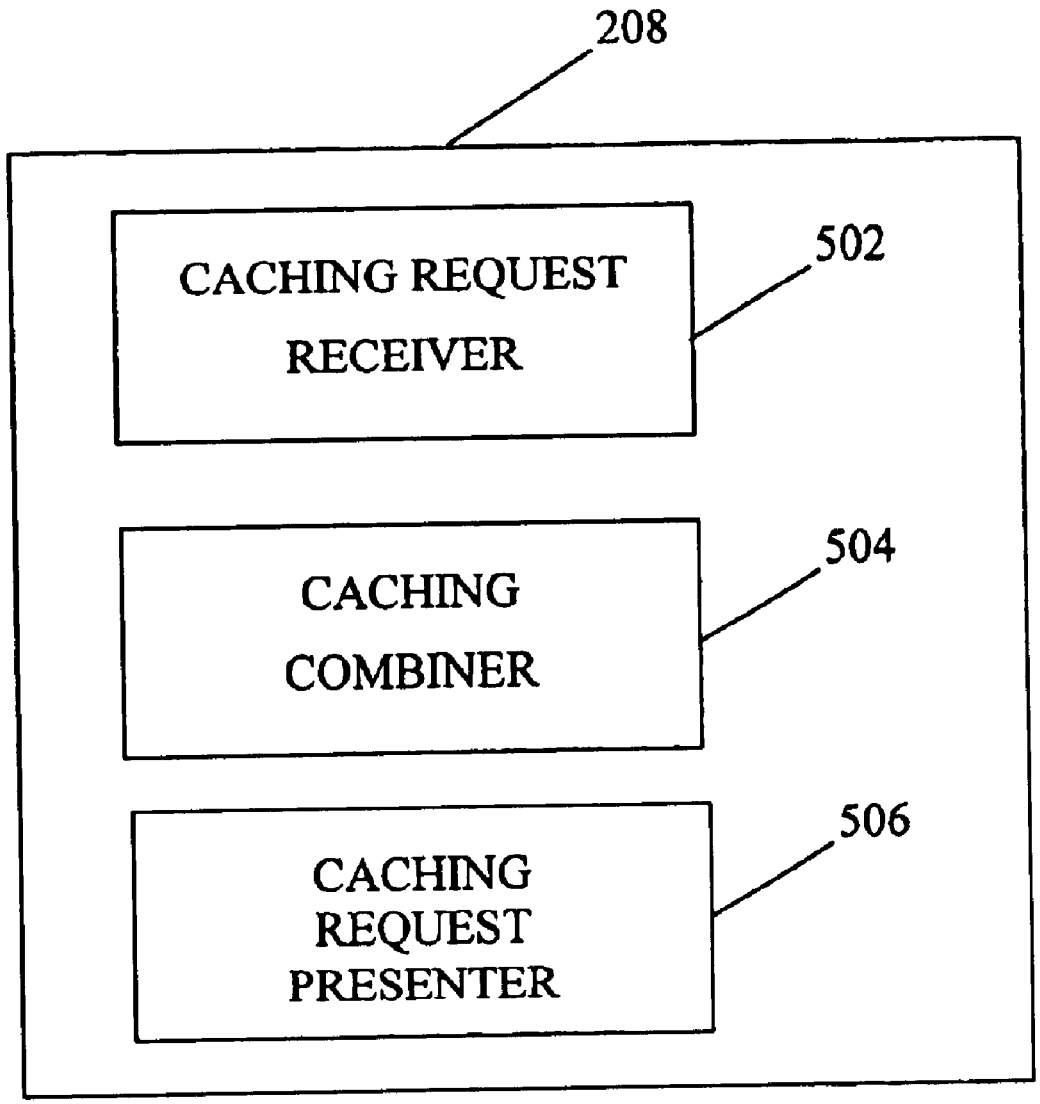
FIG. 5 illustrates an embodiment of a caching aggregator.

FIG. 5 illustrates in more detail the caching aggregator 208. The caching aggregator 208 includes a caching request receiver 502, a caching combiner 504, and a caching request presenter 506.

The caching request receiver 502 receives offers of caching services from one or more caching devices in the network.

The caching combiner 504 combines the offers of caching services for the server into a single offer of caching services.

The caching request presenter 506 is responsible for presenting the offer of caching services to the server 206 by sending the offer through the network to the server 206.

Figure 6:
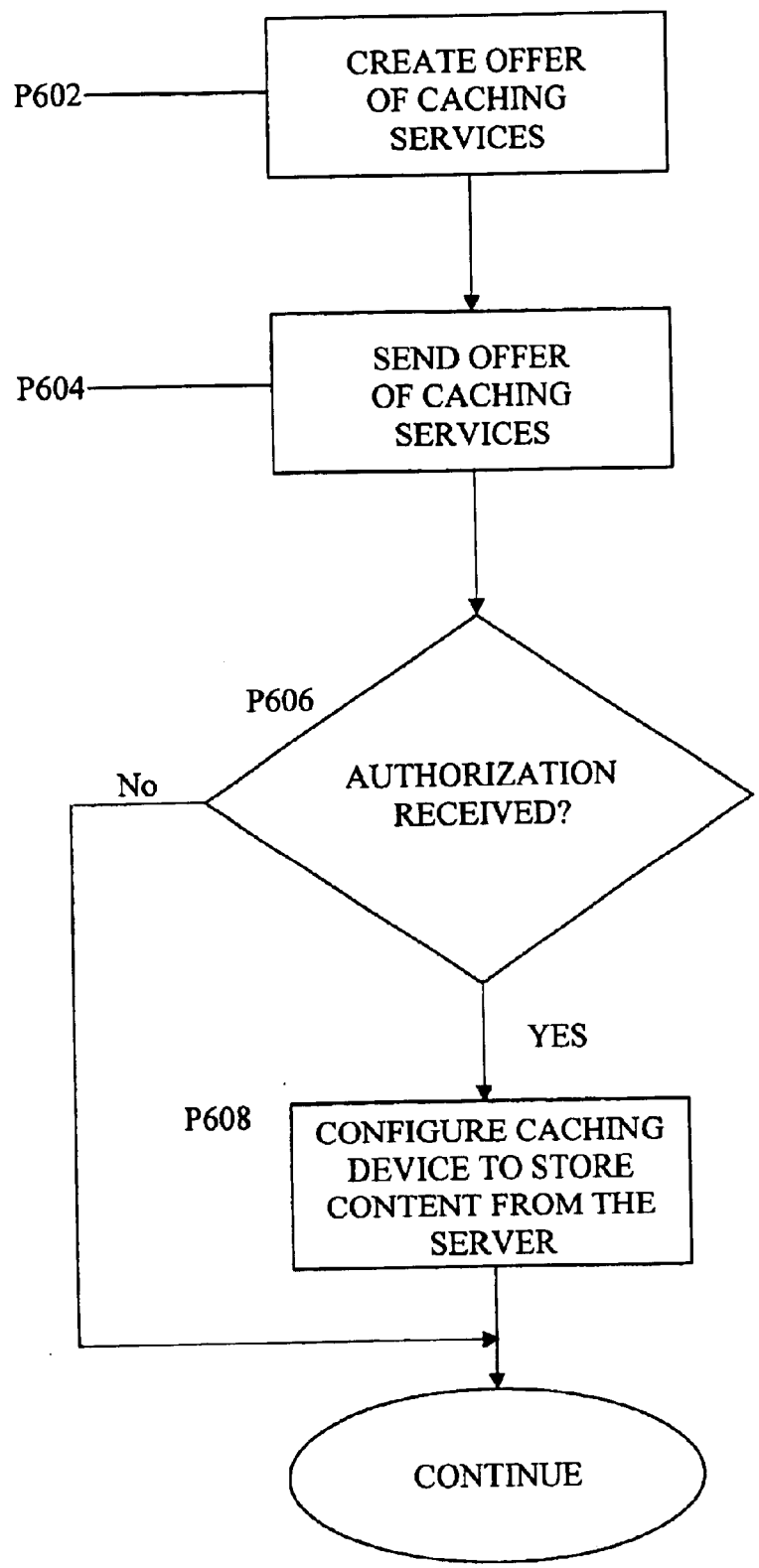
FIG. 6 is a flowchart illustrating the processing which occurs in the caching appliance.

FIG. 6 is a flowchart to help illustrate the operation of caching appliance 202.

At P602, the caching appliance creates an offer of caching services and at P604 the offer is sent to server 206.

At P606, the caching appliance determines whether an authorization has been received from server 206. If an authorization has not been received or a timeout occurred, execution continues. Otherwise, the caching appliance receives an authorization and at P608 configures the caching device to store content from the server 206.

Figure 7A:
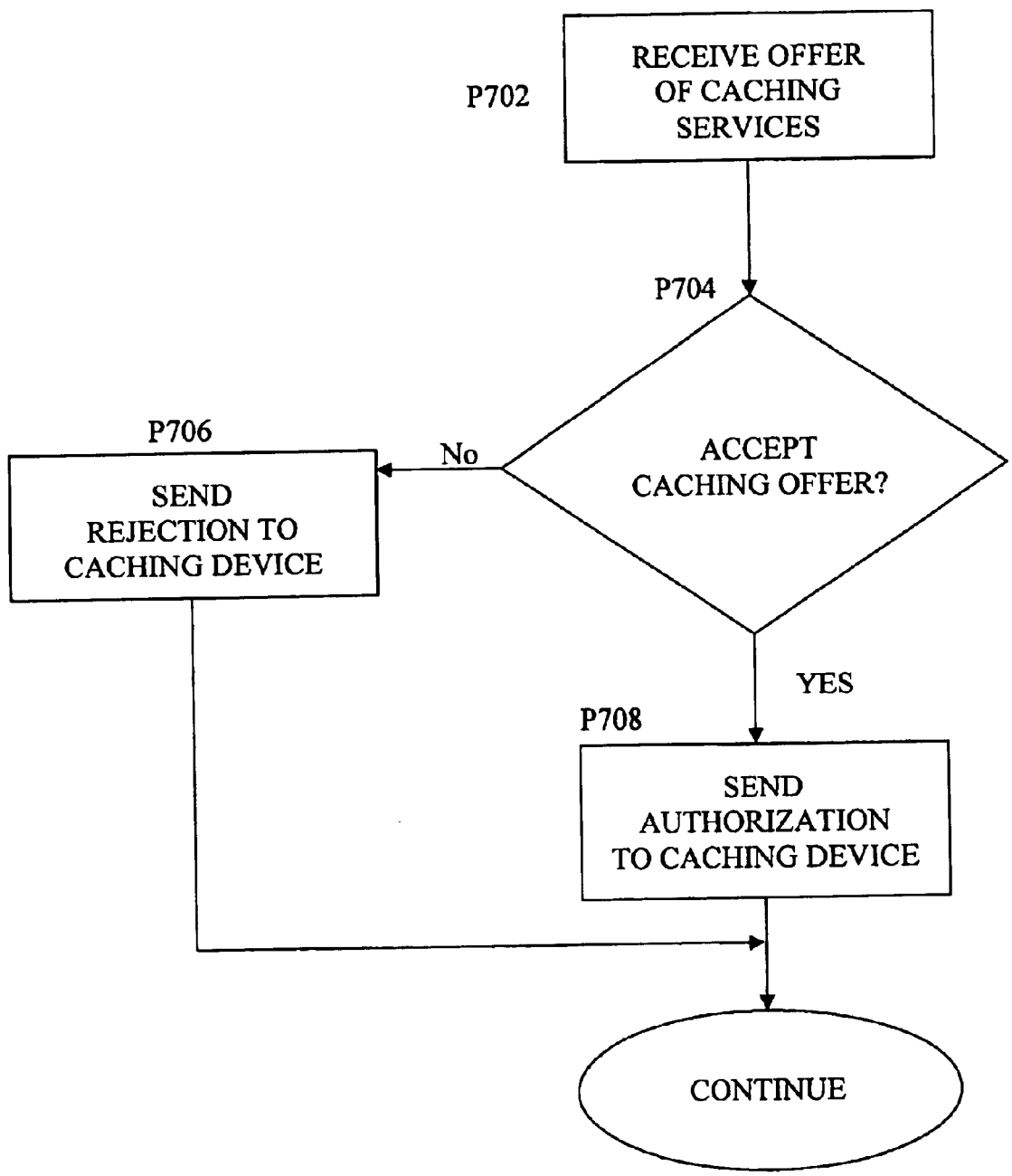
FIGS. 7A and 7B are flowcharts illustrating the processing which occurs in two embodiments of the server.

FIG. 7A illustrates the processing and operation occurring within server 206. At P702, the server receives an offer of caching services and sends an indication that the offer has been received.

At P704, the caching reservation scheduler determines whether conditions exist, as described above, such that the offer should be accepted. If the offer should not be accepted, either a rejection or no response at all is sent to the caching appliance in P706. If the internet caching reservation scheduler 404 determines that the offer of caching services should be accepted, then at P708, an authorization is created and sent to the caching device.

In another embodiment of the invention, all offers of caching services sent from caching appliances may be sent to a caching aggregator 208 for receiving and coordinating the offer of caching services to a server 206.

Figure 7B:
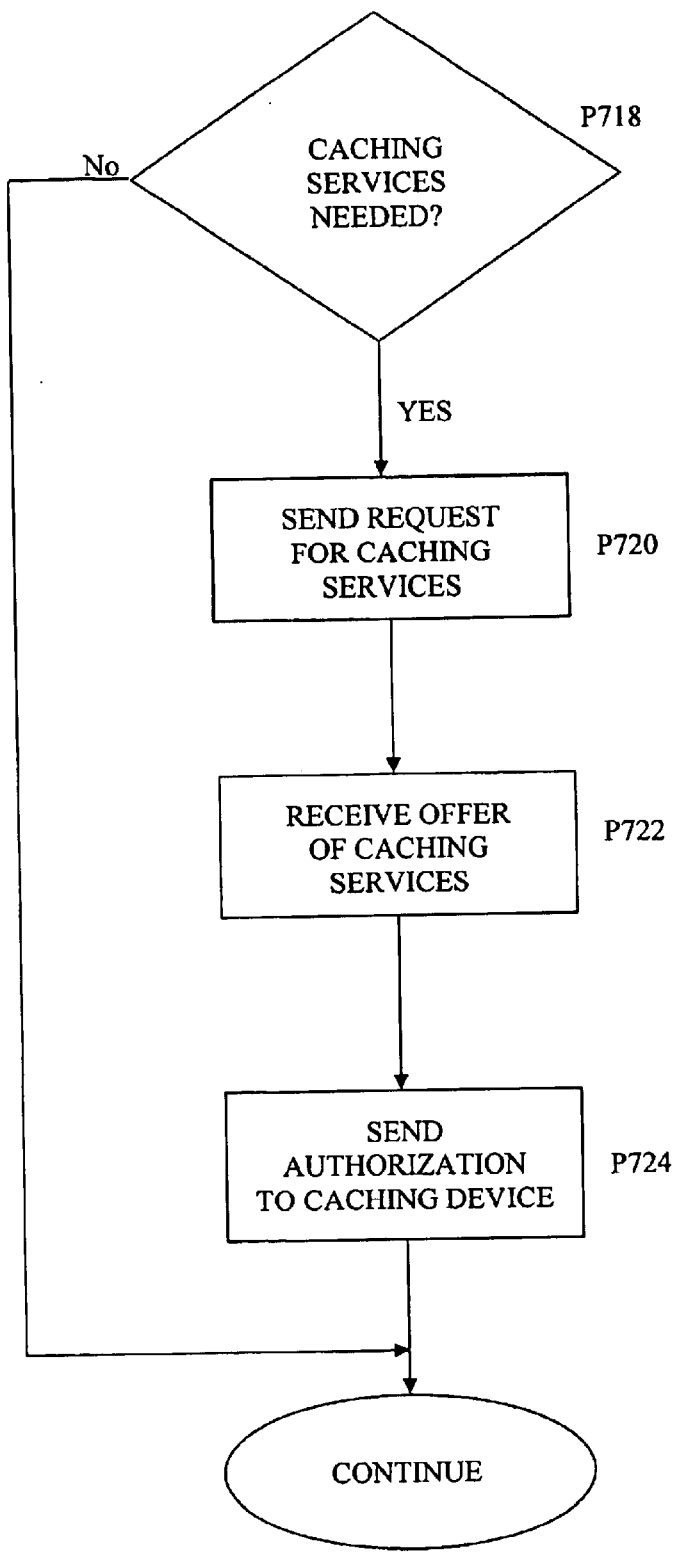

FIG. 7B illustrates the processing and operation in another embodiment of the server which proactively requests an offer for caching services from a caching appliance 202 or caching aggregator 208.

At P718, a determination is made by the internet cache reservation scheduler 404 as to whether caching services are needed by determining the existence of certain conditions, as described previously. Thresholds that indicate caching is needed when the server 206 is proactive can vary from the case in which the server 206 is passive. For example, if the server is passive, i.e., waiting for a caching appliance 202 or caching aggregator 208 to offer caching services, the server may request caching services when the server's processor utilization is above 80%. However, when the server proactively requests caching services, the server may request the caching services when the server's processor utilization is above 85%.

At P720, the transaction initiator sends the request for an offer of caching services to a caching appliance 202 or a caching aggregator 208. The request may be sent, for example, via a multicast transmission to caching aggregators 208 and/or caching appliances 202 configured to be members of the multicast group. The request for an offer may contain address or location information of the server 206. In an embodiment of the invention, each caching aggregator 208 and caching appliance 202 may determine whether to respond with an offer based on the address or location information included in the request for an offer. For example, the caching aggregators 208 and the caching appliances 202 may be configured to respond only to requests for offers coming from certain addresses or locations.

At P722, an offer for caching services is received by the internet cache reservation scheduler 404. Since the internet cache reservation scheduler 404 will determine that conditions exist such that caching should be performed, at P724, an authorization is sent to the caching aggregator 208 or the caching appliance 202.

Figure 8:
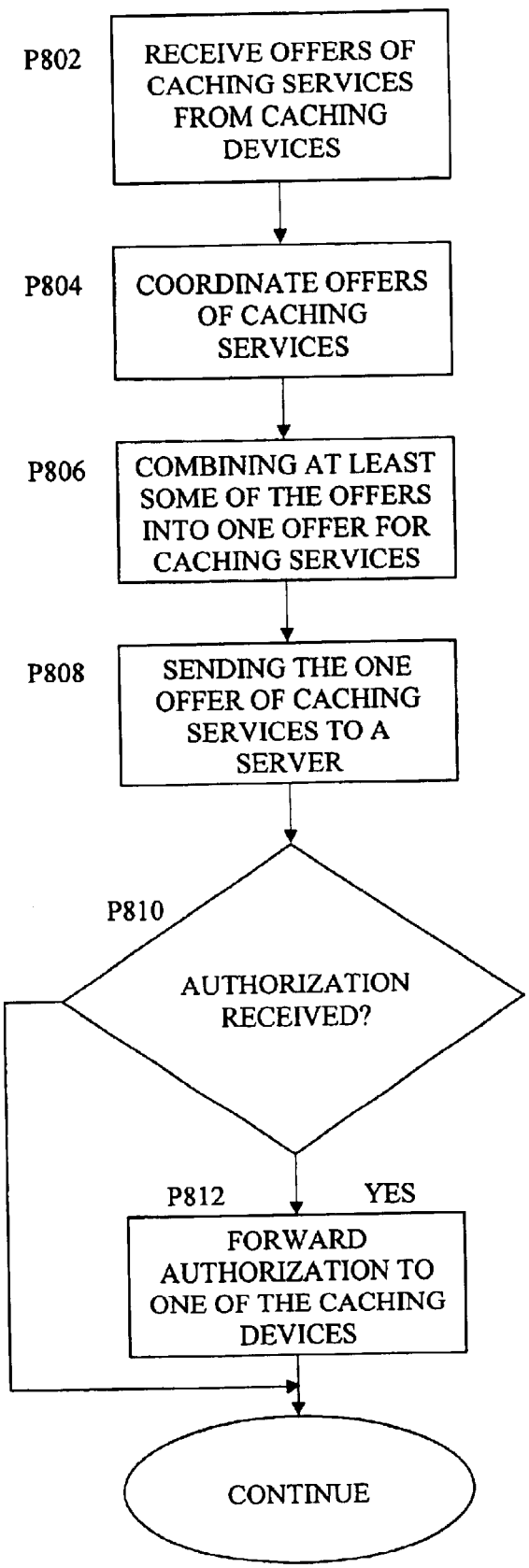
FIG. 8 is a flowchart illustrating the processing which occurs in the caching aggregator.

FIG. 8 explains the operation of caching aggregator 208.

At P802, the caching request receiver 502 receives offers of caching services from the caching appliances 202 and sends an indication back to the caching appliances 202 informing the caching appliances 202 that the offer has been received.

At P804, the caching combiner 504 coordinates the offers of caching services and at P706 at least some of the offers for caching services are combined into one offer for caching services. At P808, the caching request presenter 506 sends the offer to the server 206.

In an embodiment of the invention, the caching aggregator 208 may receive offers for caching from many different networks of caching appliances. The aggregator 208 combines all of the received caching offers into one offer for a server 206 and presents this offer to the server 206. The caching aggregator may also act as a record keeper for all of the caching transactions. The caching records kept by the aggregator may be used to bill the owners of the origin servers and to pay the owners of the caching appliances. The caching aggregator is coordinator and record keeper of all of the caching transactions that take place between the caching appliances and the origin servers.

At P810 a determination is made as to whether an authorization was received from the server. If an authorization was received then, at P812, the authorization is forwarded to a selected one of the caching devices which will then configure itself to store content from the server 206. Thus, the caching aggregator 208 acts on behalf of the caching devices for each network of caches. The aggregator 208 receives offers from the caching devices for these services and combines the offers to create one offer for caching that is presented to an origin server 206.

In an embodiment of the invention the caching appliance 202 has a transaction requester 302 and/or a transaction executer 304 implemented in software.

In another embodiment of the invention, a web caching appliance 202 has one or more of the transaction requester 302, the transaction executer 304, and the caching status and statistics determiner 306 implemented in software.

Figure 9:
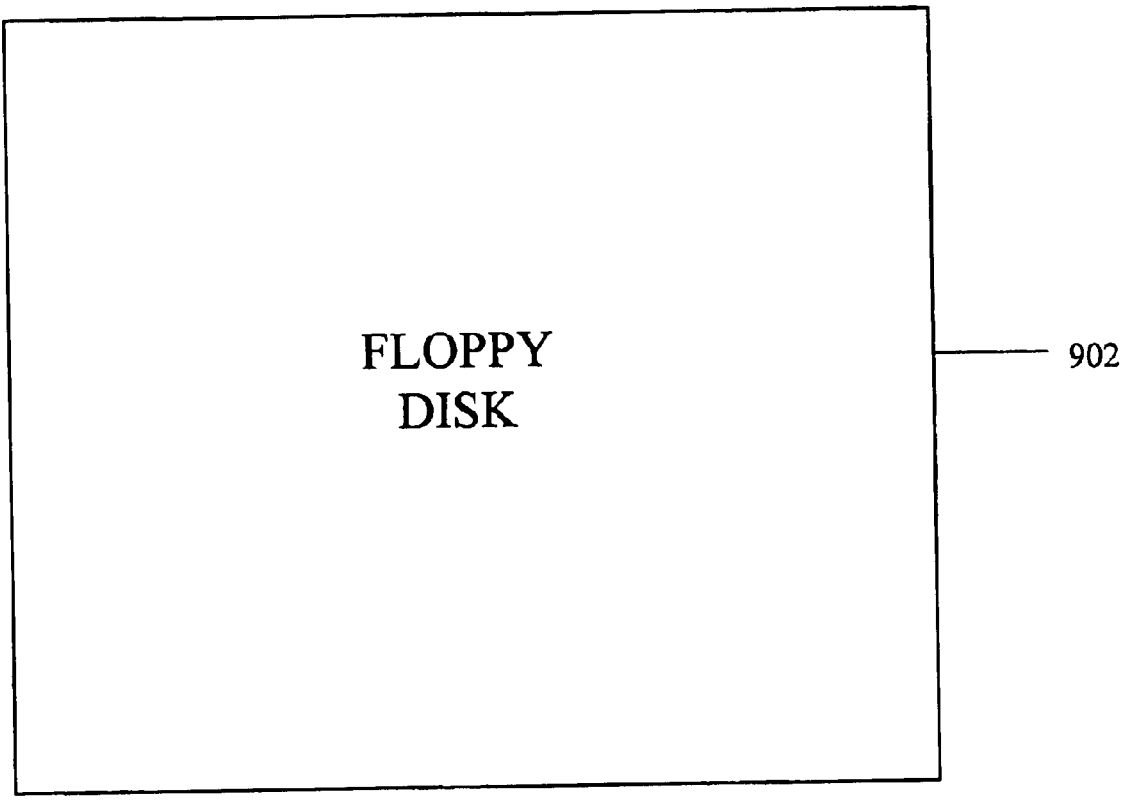
FIG. 9 illustrates a medium capable of containing instructions for a processor to implement the described method of providing caching services.

Machine-readable instructions for implementing any of the above components of the caching appliance 202 may be written on a medium such as floppy disk 902, shown in FIG. 9, or stored in a computer memory or any other medium capable of being read and executed by a processor.

Similarly, internet server dispatcher 402 and/or internet cache reservation scheduler 404 may be implemented in software and the software may be recorded on a medium such as a floppy disk 802, a read only memory, or a random access memory, or any other device capable of storing computer instructions to be later read and executed by a processor.

Further, caching request receiver 502, caching combiner 504, and caching request presenter 506 may be implemented in software and the software may be recorded on a medium such as a floppy disk 802, a read only memory, or a random access memory, or any other device capable of storing computer instructions to be later read and executed by a processor.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular means, materials, and embodiments, it is understood that the invention is not limited to the particulars disclosed. The invention extends to all equivalent structures, means, and uses which are within the scope of the appended claims.

We claim as our invention:

1. A method comprising:
    sending an offer requiring a compensation for providing caching services from a caching device to a server;
    receiving, by the server, the offer requiring the compensation for providing caching services from the caching device;
    determining, by the server, whether to accept the offer requiring the compensation for providing caching services from the caching device;
    sending an authorization from the server to the caching device when, as a result of the determining, the server determines to accept the offer requiring the compensation for providing caching services; and
    storing content, by the caching device, from the server after the sending of the authorization from the server to the caching device.

2. The method of claim 1, wherein the determining comprises determining to accept the offer when performance of the server is determined to be below a specific level.

3. The method of claim 1, wherein the determining comprises determining to accept the offer when an amount of traffic on the server exceeds a specific level.

4. The method of claim 1, wherein the determining comprises determining to accept the offer when an amount of processor utilization of a processor of the server exceeds a specific level.

5. The method of claim 1, further comprising coordinating, among a plurality of caching devices, offering caching services to at least one server.

6. The method of claim 1, further comprising sending caching statistics, pertaining to the server, from the caching device to the server.

7. A method comprising:
    sending a plurality of offers requiring a plurality of compensations for providing a plurality of caching services from a plurality of caching devices to a caching aggregator;
    receiving of the plurality of offers requiring the plurality of compensations for providing the plurality of caching services by the caching aggregator;
    combining, by the caching aggregator, at least some of the plurality of offers requiring the plurality of compensations for providing the plurality of caching services to create one offer requiring a compensation for providing caching services;

sending the one offer requiring the compensation for providing caching services from the caching aggregator to a server receiving, by the server, the one offer requiring the compensation for providing caching services from the caching aggregator;

determining, by the server, whether to accept the one offer requiring the compensation for providing caching services;

sending an authorization from the server to the caching aggregator when, as a result of the determining, the server determines to accept the one offer requiring the compensation for providing caching services; and storing content, by one of the plurality of caching devices, from the server after the sending of the authorization from the server to the caching aggregator.

8. The method of claim 7, wherein the determining comprises determining to accept the one offer when performance of the server is determined to be below a specific level.

9. The method of claim 7, wherein the determining comprises determining to accept the one offer when an amount of traffic on the server exceeds a specific level.

10. The method of claim 7, wherein the determining comprises determining to accept the one offer when an amount of processor utilization of a processor of the server exceeds a specific level.

11. The method of claim 7, further comprising sending caching statistics, pertaining to the server, from the one of the plurality of caching devices to the server.

12. A caching device comprising:

a transaction requester to create and send an offer requiring a compensation for providing caching services to a server;

a transaction executer to receive an authorization sent from the server in response to the offer requiring the compensation for providing caching services; and a cache storage to store content received from the server.

13. The caching device of claim 12, further comprising a caching statistics determiner to determine and to send to the server caching statistics pertaining to the server.

14. The caching device of claim 12, further comprising a caching coordinator to coordinate sending of the offer requiring the compensation for providing caching services with at least one other caching device.

15. A caching aggregator comprising:

a caching request receiver to receive a plurality of offers requiring a plurality of compensations for providing a plurality of caching services from a plurality of caching devices in a computer network;

a caching combiner to combine the plurality of offers requiring the plurality of compensations for providing the plurality of caching services for the server from the plurality of caching devices into a single offer requiring a compensation for providing caching services; and a caching request presenter to send the single offer requiring the compensation for providing caching services to the server.

16. The caching aggregator of claim 15, wherein the plurality of caching devices are in more than one caching network.

17. A server comprising:

a dispatcher for receiving an offer requiring a compensation for providing caching services; and a caching reservation scheduler to accept the offer requiring the compensation for providing caching services according to predefined criteria.

18. The server of claim 17, wherein the caching reservation scheduler accepts the offer when performance of the server is determined to be below a specific level.

19. The server of claim 17, wherein the caching reservation scheduler accepts the offer when an amount of traffic on the server exceeds a specific level.

20. The server of claim 17, wherein the caching reservation scheduler accepts the offer when an amount of processor utilization of a processor of the server exceeds a specific level.

21. The server of claim 17, further comprising a transaction initiator to request the offer requiring the compensation for providing caching services when the caching reservation scheduler determines that the caching services are needed according to the predefined criteria.

22. A machine-readable medium having information recorded thereon, such that when said information is read and executed by a caching device connected to a network, the caching device is caused to perform:

sending, through the network, an offer requiring a compensation for providing caching services from the caching device to a server;

waiting for an authorization from the server; and storing content from the server after receiving the authorization from the server.

23. The machine-readable medium of claim 22, wherein the caching device is further caused to perform coordinating, among a plurality of caching devices, offering caching services requiring a compensation to at least one server.

24. The machine-readable medium of claim 22, wherein the caching device is further caused to perform sending caching statistics, pertaining to the server, from the caching device to the server.

25. A machine-readable medium having information recorded thereon, such that when said information is read and executed by a server connected to a network, the server is caused to perform:

determining, after receiving an offer requiring a compensation for providing caching services from a caching device connected to the network, whether to accept the offer requiring the compensation for providing caching services; and sending an authorization from the server to the caching device when, as a result of the determining, the server determines to accept the offer requiring a compensation for providing caching services.

26. The machine-readable medium of claim 25, wherein the determining comprises determining to accept the offer when performance of the server is determined to be below a specific level.

27. The machine-readable medium of claim 25, wherein the determining comprises determining to accept the offer when an amount of traffic on the server exceeds a specific level.

28. The machine-readable medium of claim 25, wherein the determining comprises determining to accept the offer when an amount of processor utilization of a processor of the server exceeds a specific level.

* * * * *